(12) United States Patent
Frecassetti et al.

(10) Patent No.: US 6,954,619 B2
(45) Date of Patent: Oct. 11, 2005

(54) METHOD AND SYSTEM FOR DOUBLING THE SPECTRUM EFFICIENCY IN A RADIO TRANSMISSION SYSTEM BY TRANSMITTING THE SAME SIGNAL FROM TWO DIFFERENT ANTENNAS

(75) Inventors: Mario Giovanni Frecassetti, Bergamo (IT); Claudio Colombo, Biassono (IT); Primo Garofoli, Milan (IT)

(73) Assignee: Alcatel, Paris (FR)

( * ) Notice: Subject to any disclaimer, the term of this patent is extended or adjusted under 35 U.S.C. 154(b) by 449 days.

(21) Appl. No.: 10/243,748

(22) Filed: Sep. 16, 2002

(65) Prior Publication Data

US 2003/0114108 A1 Jun. 19, 2003

(30) Foreign Application Priority Data

Dec. 19, 2001 (IT) ........................... MI2001A2685

(51) Int. Cl.[7] ................................. H04B 7/02
(52) U.S. Cl. .................. 455/101; 455/562.1; 455/561; 370/315
(58) Field of Search ................ 455/101, 562.1, 455/561, 447; 370/315; 342/368, 372

(56) References Cited

U.S. PATENT DOCUMENTS

| | | | | |
|---|---|---|---|---|
| 5,432,522 A | * | 7/1995 | Kurokami | 342/361 |
| 5,613,219 A | * | 3/1997 | Vogel et al. | 455/78 |
| 6,125,109 A | * | 9/2000 | Fuerter | 370/315 |
| 6,459,740 B1 | * | 10/2002 | Lo | 375/259 |
| 6,658,269 B1 | * | 12/2003 | Golemon et al. | 370/315 |
| 6,771,706 B2 | * | 8/2004 | Ling et al. | 375/267 |
| 6,785,520 B2 | * | 8/2004 | Sugar et al. | 455/101 |
| 2002/0150070 A1 | * | 10/2002 | Shattil | 370/342 |

* cited by examiner

Primary Examiner—Tilahun Gesesse

(74) Attorney, Agent, or Firm—Sughrue Mion, PLLC

(57) ABSTRACT

Described is a method and system for increasing the spectrum efficiency in a radio transmission system. Advantageously, the interference phenomenon is used for transmitting two different signals, by utilizing for each of them carriers at the same frequency, thus obtaining in this way a doubling of the spectrum efficiency. Practically, the same signal is transmitted by two different antennas in order to have two coherent signal sources. On the receiving front, there are points of maximum and minimum of this signal. If the original signal is properly phase shifted with an antenna vis-à-vis the other one, the effect will be to arrange the maxima and minima on the receiving front in a corresponding way. The present invention allows for the use of dual polarization antennas (H and V or any other type of orthogonal polarization) to obtain a still higher spectrum efficiency.

12 Claims, 7 Drawing Sheets

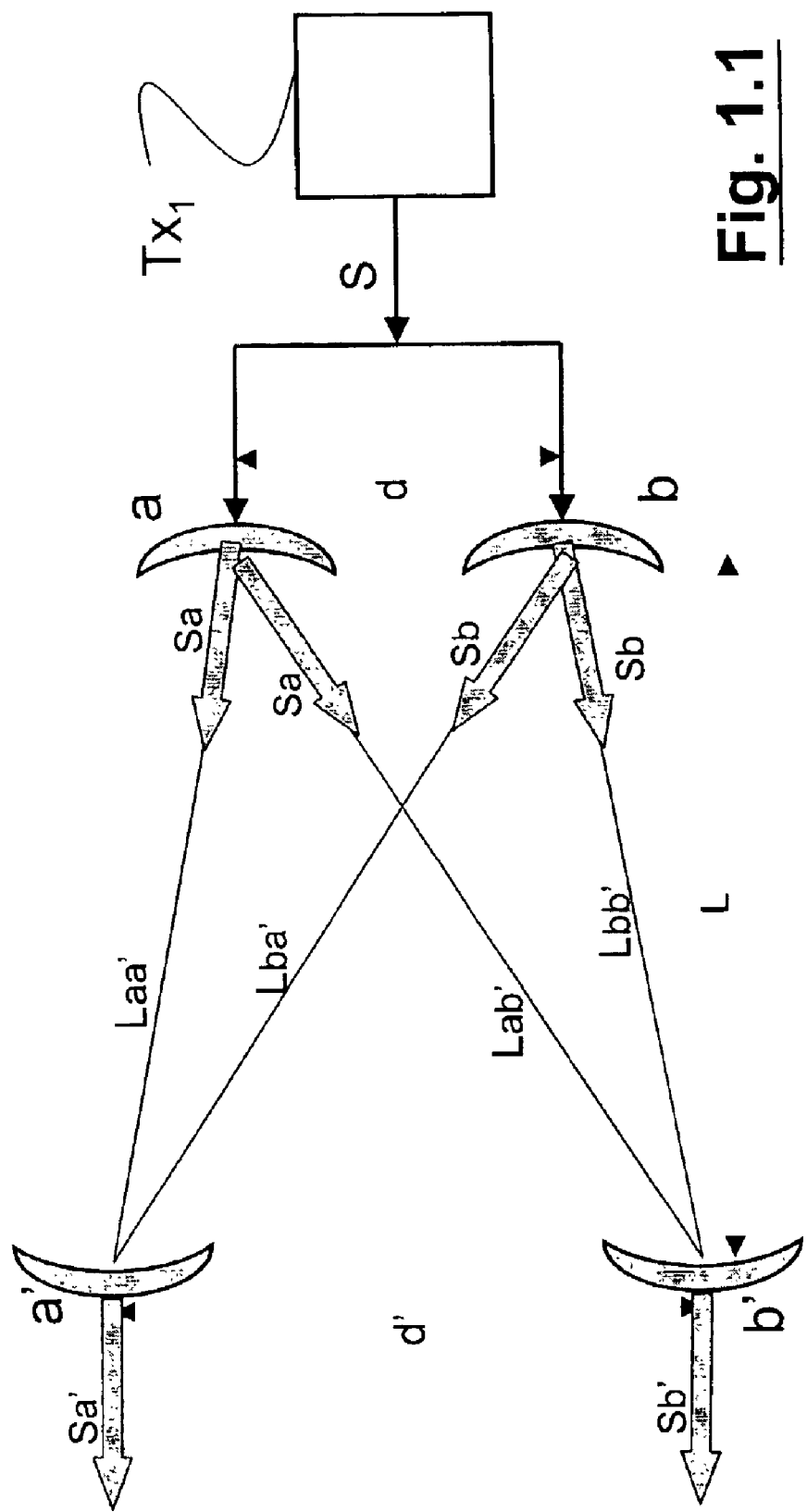
Fig. 1.1

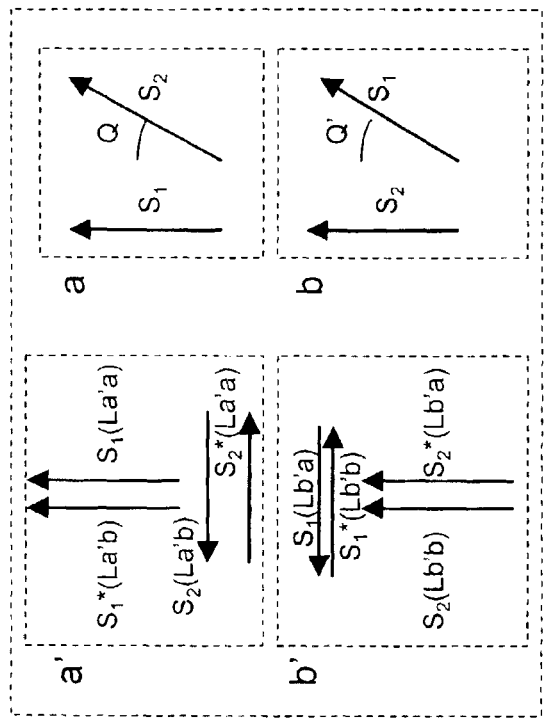
Fig. 3.2
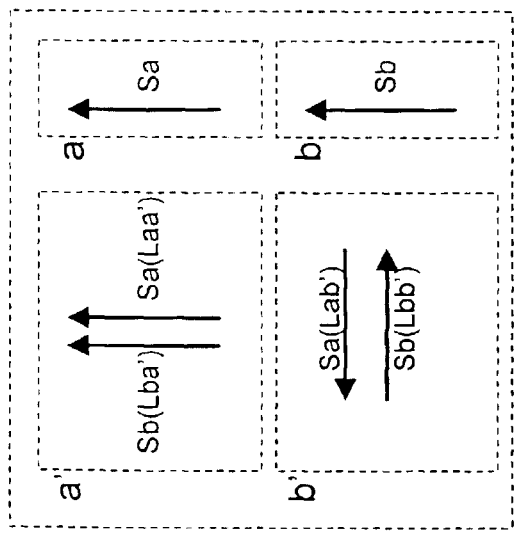
Fig. 1.2
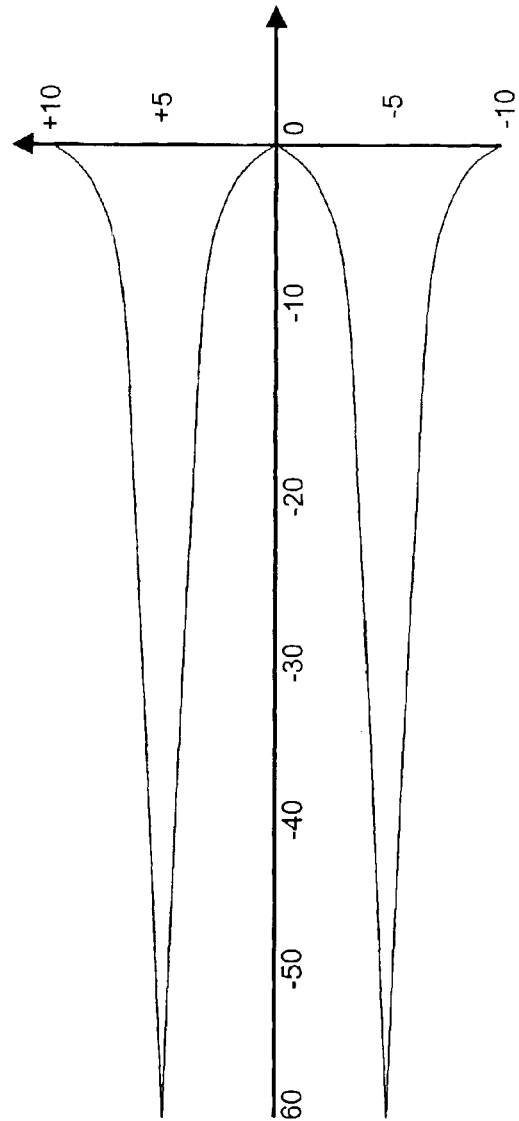
Fig. 1.3

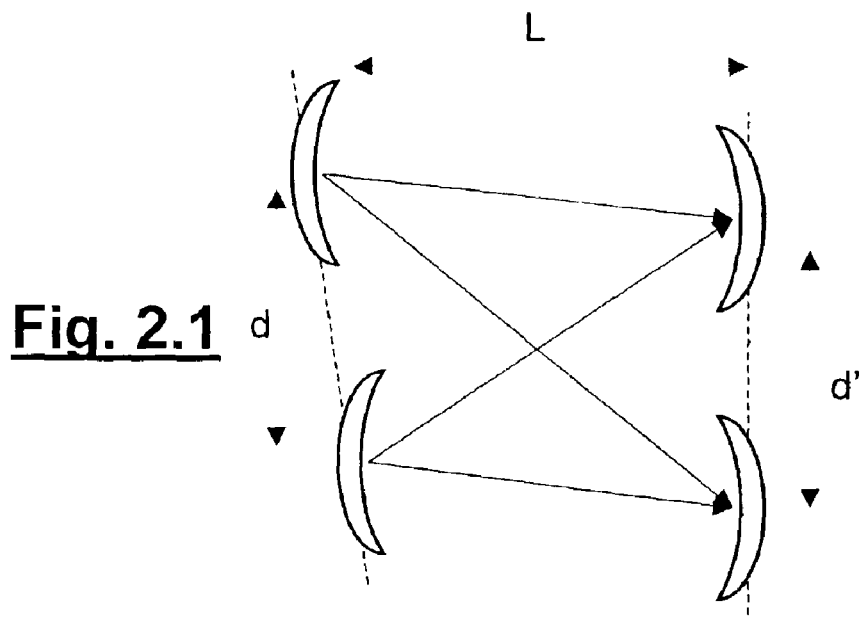
Fig. 2.1
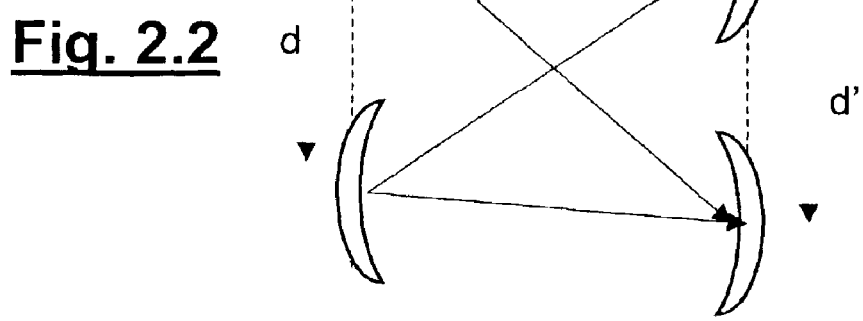
Fig. 2.2
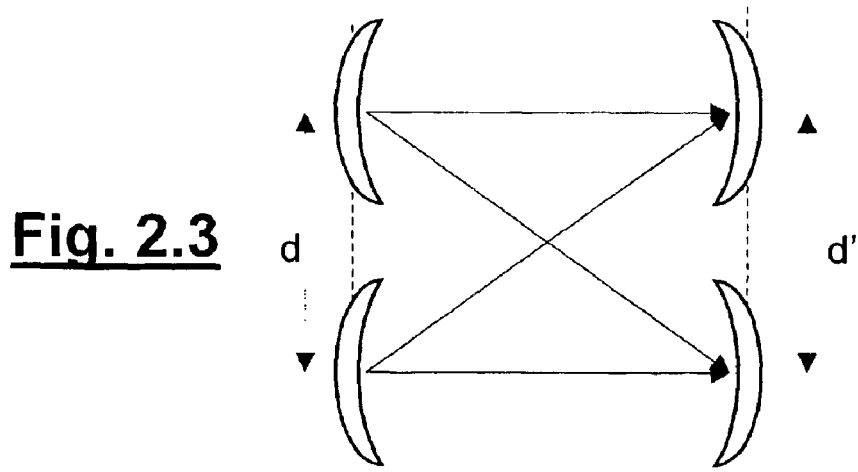
Fig. 2.3

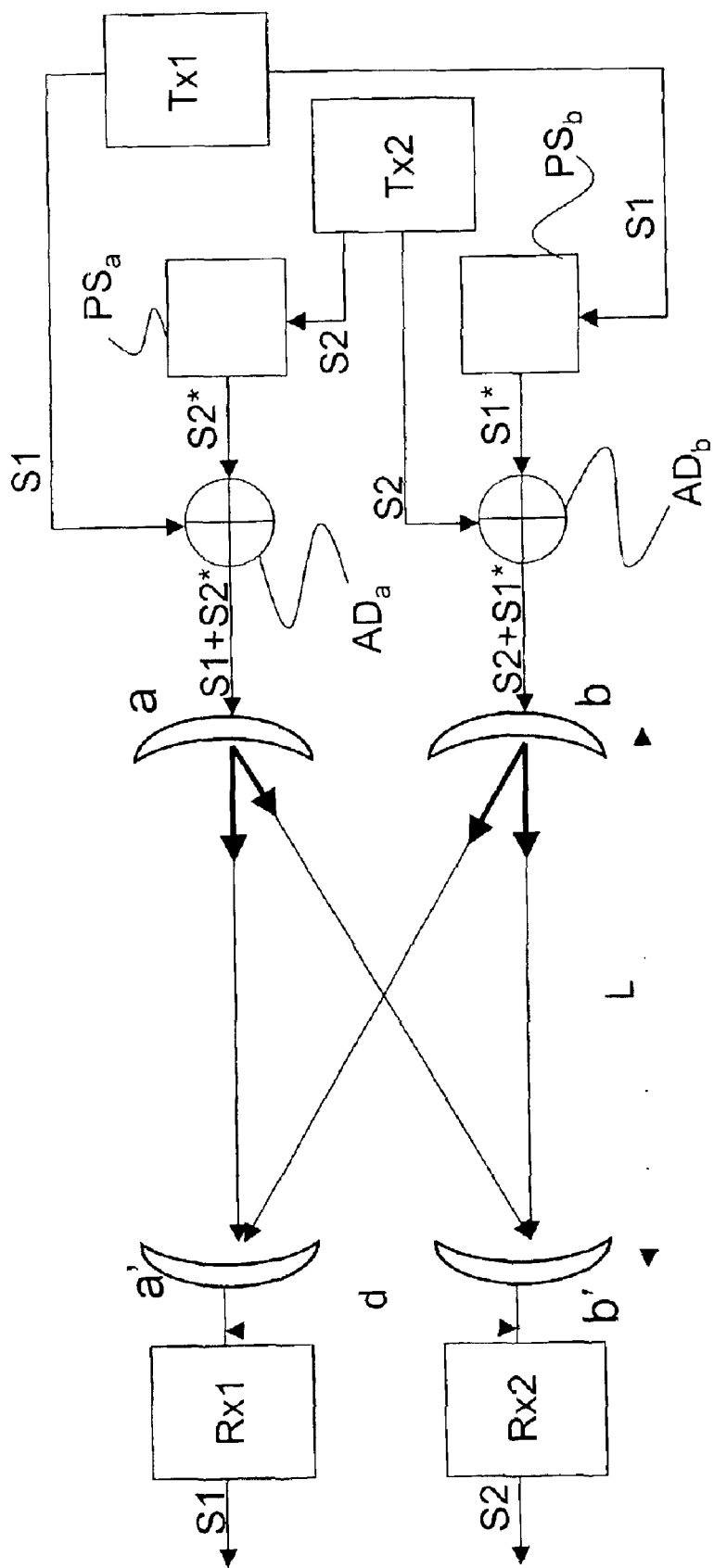
Fig. 3.1

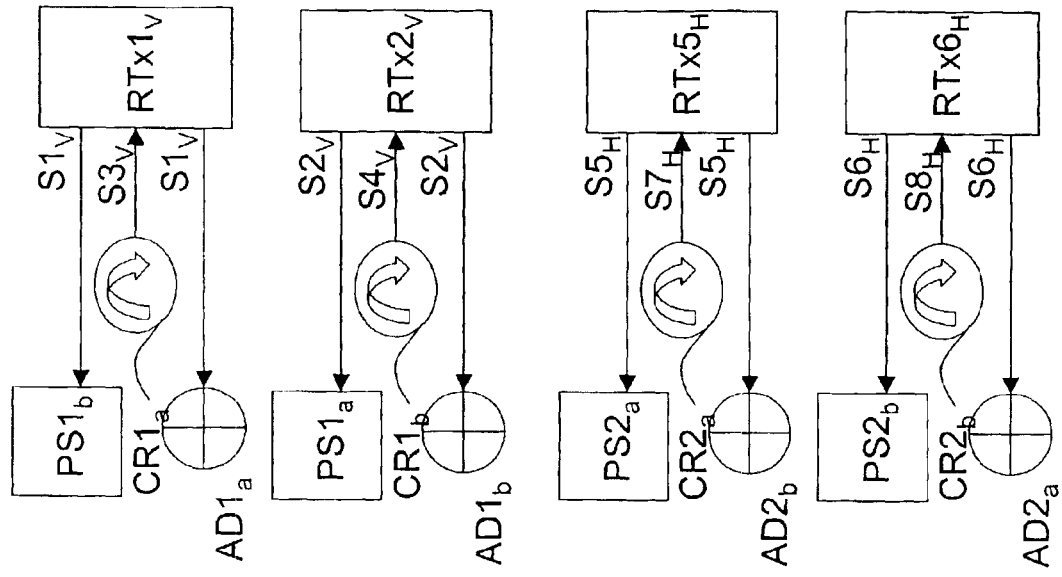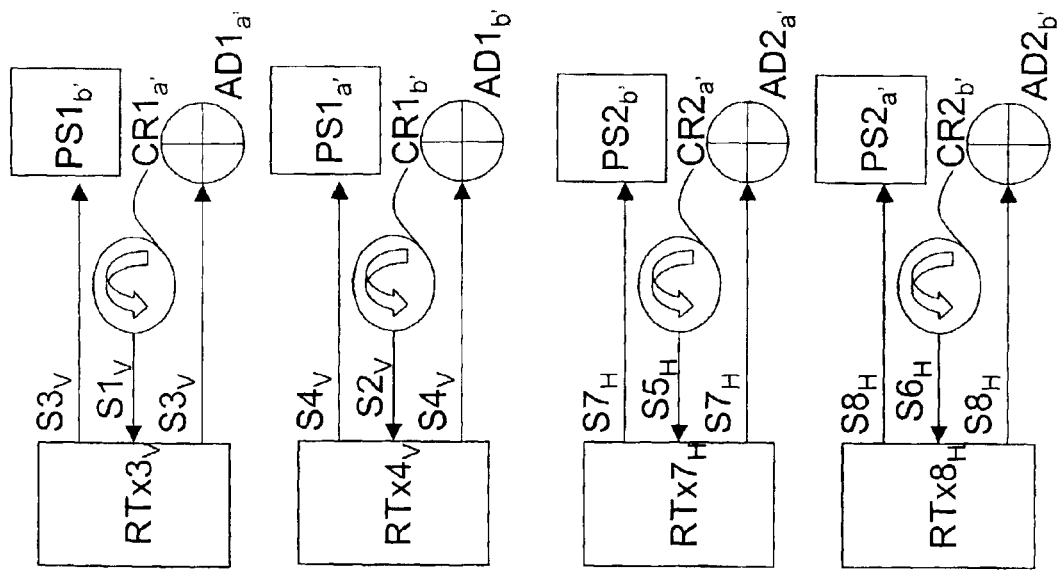
Fig. 6

METHOD AND SYSTEM FOR DOUBLING THE SPECTRUM EFFICIENCY IN A RADIO TRANSMISSION SYSTEM BY TRANSMITTING THE SAME SIGNAL FROM TWO DIFFERENT ANTENNAS

INCORPORATION BY REFERENCE OF PRIORITY DOCUMENT

This application is based on, and claims the benefit of, Italian Patent Application No. M12001 A002685 filed on Dec. 19, 2001, which is incorporated by reference herein.

BACKGROUND OF THE INVENTION

1. Field of the Invention

The present invention generally relates to radio transmissions and in particular to a radio transmission method and system having a high spectrum efficiency, evaluated in terms of transmission capacity of a radio channel.

2. Description of the Prior Art

As is known, radio transmissions are particularly attractive for their possibility of connecting two (or more) stations, spaced apart by large distances, without the need to lay cables or wires between the stations. Nevertheless, one of the limitations which affects such a type of transmission is the spectrum efficiency, evaluated in terms of transmission capacity of a radio channel, that is rather reduced. In order to increase the spectrum efficiency, several solutions, presently utilized, have been devised.

The classic solution consists in increasing the complexity of modulation in the transmission step. In other words, a higher number of symbols is transmitted and in this way it is as if the transmitted bit/sec were increased.

An alternative solution, which is also utilizable in association with the classic solution, consists in the so-called "frequency re-use". The known types of frequency reuse systems are: spatial frequency reuse; polar frequency reuse and angle frequency reuse.

SUMMARY OF THE INVENTION

The main object of the present invention is providing a radio transmission system which has a spectrum efficiency increased vis-à-vis the one obtained by one or the other of the known solutions. The present invention provides a system which is different from all the known frequency reuse systems but it could be used in addition to (namely together with) the above known systems.

A further object of the present invention is providing a radio transmission system with an increased spectrum efficiency which can be used in combination with the known solutions in order to supply a system with a higher spectrum efficiency.

These and further objects are obtained by a method and a system having the features set forth in the appended claims. All the claims should be considered as an integral part of the present description.

The basic idea of the present invention is to exploit conveniently the interference phenomenon in order to transmit two different signals by utilizing, for each of them, carriers at the same frequency, by obtaining in this way a doubling of the spectrum efficiency, namely of the amount of information transmitted in the frequency band unit that is occupied.

Practically, it is transmitted the same signal from two different antennas in order to have two coherent sources of signal. In this way, at the receiving front there are two points of maximum and two points of minimum of this signal. If the original signal is properly shifted with an antenna with respect to the other one, the effect will be in the possibility to place the maxima and minima at the receiving front in a corresponding way (and therefore freely).

The present invention docs not prevent the use, and really it could easily use, double polarization antennas (H & V or whichever type of orthogonal polarization) to obtain a higher spectrum efficiency.

There now follows a detailed description of the present invention, given as an example and not as a limitation, to be read with reference to the attached drawings.

BRIEF DESCRIPTION OF THE DRAWINGS

In the drawings:

FIG. 1.1 shows a radio transmission system for transmitting a signal S through a carrier frequency P;

FIG. 1.2 shows the frequency plan of the system of FIG. 1.1;

FIG. 1.3 shows, for a particular system configuration, a diagram with the field value in ordinate versus the distance between the reception points in abscissa;

FIGS. 2.1–2.3 illustrate the receiving/transmitting fronts (first front and second front) and the mutual position of antennas;

FIG. 3.1 shows an unidirectional radio transmission system according to the present invention;

FIG. 3.2 shows the frequency plan of system of FIG. 3.1;

FIG. 6 is a completion of FIG. 5.

BEST MODE FOR CARRYING OUT THE INVENTION

Figure 4:
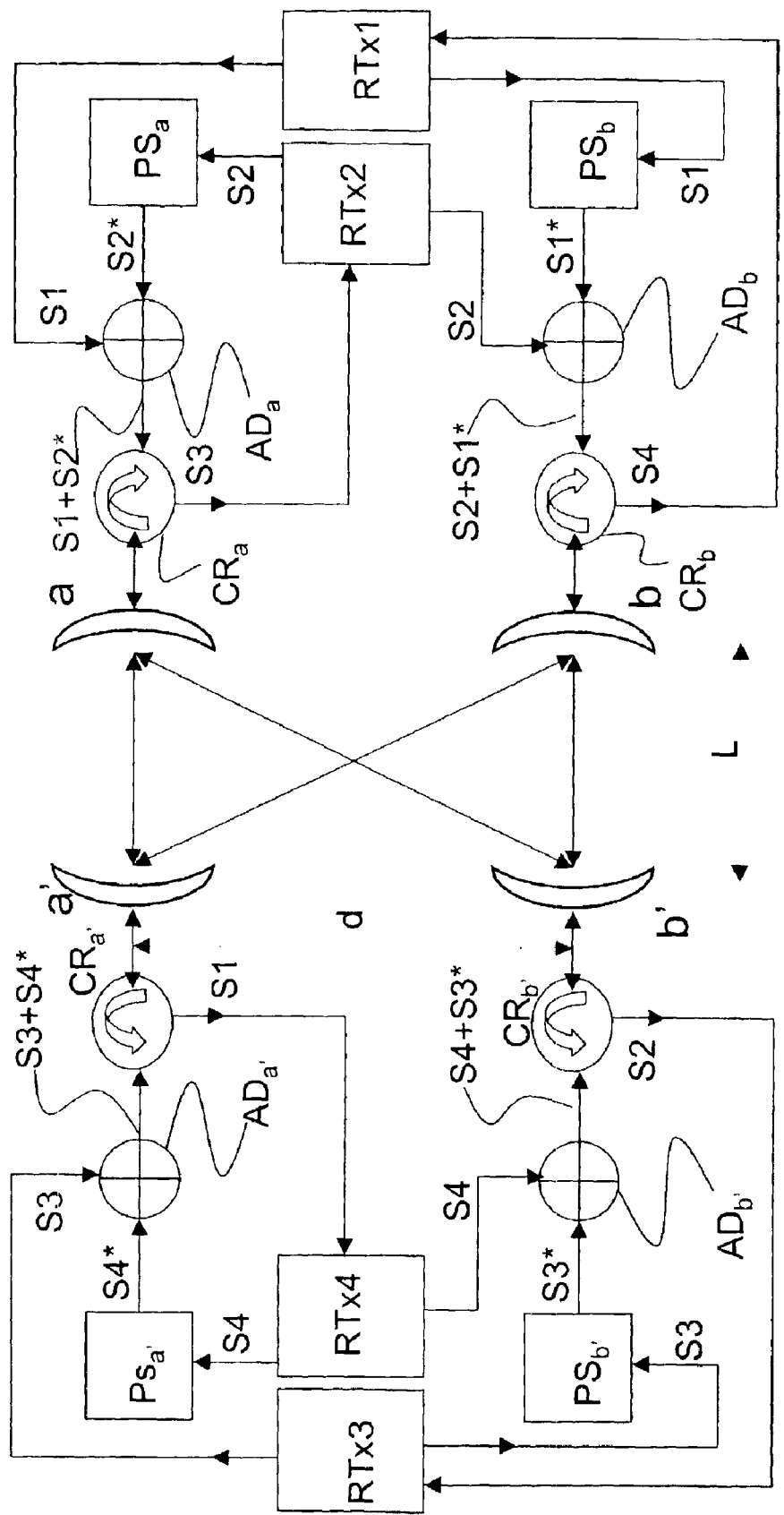
FIG. 4 shows a bidirectional radio transmission system according to the present invention.

The interference is a typical effect of waves propagation which occurs when two oscillatory motions having the same frequency and a constant phase difference travel through the same space-time region. Thomas Young was one of the first researchers to be interested in such a phenomenon, who was able to prove the underatory nature of light through it by confuting the corpuscular Newton theory. The experimental apparatus of Young consisted in a point and monochrome light source illuminating a screen with two small holes: owing to the Huygens principle, the holes acted as secondary sources of spherical coherent light waves, and during the construction step, so that the resulting light produced an interference. Downwards of the holes, zones of maximum illumination and dark zones were observed, corresponding to the ventral and nodal zones.

The theoretical understanding of the phenomenon is based on a simple law for composition of amplitudes of the oscillatory motions: the amplitudes produced by each hole at a point P, at a distance $r_1$ from the first hole and $r_2$ from the second one, can be written as:

$$x_1 = x_{01} \cdot \sin(wt - kr_1) \quad x_2 = x_{02} \cdot \sin(wt - kr_2)$$

and the phase difference in P is $d = k \cdot (r_1 - r_2)$ therefore, with the rotating vector technique, it is possible to find the resulting amplitude in P as $x_p = (x_{012} + x_{022} + 2x_{01}x_{02} \cos d)^{1/2}$ and the cosinusoidal term produces the constructive and destructive effects which are characteristic of interference. For instance, if the amplitudes $x_{01}$ and $x_{02}$ are equal, for the illumination intensity it is possible to use the expression $I_p = 4x_{02} \cos^2 d/2$.

The above is a general effect which is applied without any particular modifications to any undulatory motion, and in particular also to the propagation of radio waves.

The basic idea of the present invention is based on the proper exploitation of the interference phenomenon to transmit two different signals, by utilizing for each of them carriers at the same frequency, thus obtaining in this way a double spectrum efficiency, namely a double amount of information transmitted within the occupied frequency band unit.

In FIG. 1.1 it is shown the case of a transmitter $TX_1$ transmitting a signal S through a carrier frequency P. If this signal is transmitted by two antennas a and b placed at a distance d one from each other, owing to the interference phenomenon, on an hypothetical receiving front placed at a distance I, or parallel to the connection of the two antennas a and b, there will be zones of maximum reception of the transmitted signal (Sa from the antennas and Sb from the antenna b) and zones of minimum reception. Only for a simpler description of the phenomenon, there is considered the case of a parallel receiving front, but nothing is against considering any form or position of the receiving and transmitting fronts. As hereunder shown, there are points of absolute maximum of reception with a surrounding, where the reception is kept high and points of absolute minimum of reception, where the reception is null, with a surrounding where the reception is kept low. An example of the value of the received field in the case of a carrier at 38 GHz. on a link I, 3 Km long with two antennas a and b placed at a distance d equal to 4,2 m one from each other, which emit signals in phase, is illustrated in FIG. 1.3. In FIG. 1.3, at the ordinate there is the value of the relative field (0 dB being the point of maximum received on the wave front) and at the abscissa there is the distance between the receiving points.

The presence of zones of maximum and minimum is due to the fact that in these zones a wave emitted by two spatially separated points, therefore frequency-coherent and having the same (known) amplitude and the same phase, combines. The zones of maximum are those wherein two contributions are phase added, as they have traveled the same path or as the difference of traveled path is equal to integer multiples of half wave length (referred to the carrier frequency). The zones of minimum are the ones wherein the two contributions are counter-phase summed. The system geometry and the carrier frequency determine the distance between the minima and maxima which assumes the well known form shown in FIG. 1.3.

All this is valid under the hypothesis that both the sources in a and b emit the waves at the same phase. It is easy to understand that in case of artificial phase shift before the emission of the wave by only one of the sources, it is possible to modify the positions of maxima and minima at the receiving front.

With reference to FIG. 3.1, it is supposed that:
a signal S1 is transmitted from antenna a (outgoing from the transmitter $TX_1$) on the carrier $P_0$ and the same signal S1 is transmitted from the antenna b on the carrier $P_0$ but such a signal is phase-inverted by a certain angle Q (through the delay cell or phase shifter PSb) in order to obtain an absolute maximum in a' and an absolute minimum in b' at the receiving front;
a signal S2 is transmitted from antenna b (outgoing from the transmitter $TX_2$) on the carrier $P_0$ and the same signal S2 is transmitted from the antenna a but such a signal is phase-inverted by a certain angle Q' (through the phase shifter PSa) in order to obtain an absolute maximum in b' and an absolute minimum in a' at the receiving front.

This results in that a receiver $RX_1$ placed at a' receives only the signal S1 and a receiver $RX_2$ placed in b' receives only the signal S2. Thus, we have transmitted and received two signals by utilizing the same carrier $P_0$ and therefore by occupying the very same frequency band which would be occupied by a single transmission, by doubling the spectrum efficiency. FIG. 3.2 illustrates the frequency plan of the system of FIG. 3.1.

It could be demonstrated that it is possible to fix the distance d' between the receiving antennas a' and b' as the distance d between the transmission antennas a and b in order to implement the bidirectional transmission system shown in FIG. 4.

In the system of FIG. 4 there are: a first, second, third and fourth transceivers ($RTX_1$, $RTX_2$, $RTX_3$, $RTX_4$, respectively) that generate four corresponding signals (S1, S2, S3, S4) and receive four signals (S4, S3, S2, S1); four phase shifters (PSa, PSb, PSa', PSb') for phase-shifting, by a certain angle, the signals to be transmitted (S2, S1, S4, S3) on the same carrier $P_0$, thus obtaining four respective phase shifted signals (S2*, S1*, S4*, S3*); four adders ($AD_a$, $AD_b$, $AD_{a'}$, $AD_{b'}$) for adding the non phase-shifted signals and the phase-shifted ones, thus obtaining sum signals (S1+S2*, S2+S1*, S3+S4*, S4+S3*); four three-ports circulators ($CR_a$, $CR_b$, $CR_{a'}$, $CR_{b'}$); and, of course, four antennas (a, b, a', b'). The circulators could be also diplexers or whichever device which permits to discriminate transmitted and received signals.

In the system of FIG. 4, the signal S1 is transmitted on the carrier $P_0$ from antenna a and the same signal S1 is transmitted on the carrier $P_0$ from antenna b but it is phase-shifted by a certain angle Q; on the receiving front, S1 shall have an absolute maximum in a' (output of circulator $CR_{a'}$) and an absolute minimum in b'. The signal S2 is transmitted on the same carrier $P_0$ from antenna b and the same signal S2 is transmitted from antenna a but it is phase-shifted by a certain angle Q'; on the receiving front, S2 will have an absolute maximum in b' (output of circulator $CR_{b'}$) and an aboslute minimum in a'. From the antenna a' the signal S3 is transmitted on the carrier $P_1$ and from the antenna b' the same signal S3 is transmitted on the carrier $P_1$ but phase-shifted by a certain angle Q; on the receiving front, S3 will have an absolute maximum in a (output of the circulator CRa) and an absolute minimum in b. Finally, from the antenna b' the signal S4 is transmitted on the same carrier $P_1$ and from the antenna a' the same signal S4 is transmitted but it is phase-shifted by a certain angle Q'; on the receiving front, S4 will have an absolute maximum in b (output of the circulator $CR_b$) and an absolute minimum in a.

It is known a "cross-polarization" method usually indicated as "frequency re-use" which obtains a result which is similar to the one according to the present invention. It exploits the orthogonality between the wave polarizations. In particular, it utilizes the vertical polarization (or the right-hand circular polarization) for transmitting the first signal and the horizontal polarization (or the left hand circular polarization) for transmitting the second signal.

In all respects, the system according to the present invention should be considered as belonging to the family of frequency re-use systems. The main characteristic of the present system is to be compatible with the cross-polarization systems, namely that the two systems are utilizable as alternatives, but also combined one with each other, thus obtaining excellent benefits in terms of spectrum efficiency. The system illustrated in FIGS. 5 and 6 illustrates the concepts according to the present invention when combined with the concepts of the cross-polarization.

Figure 5:
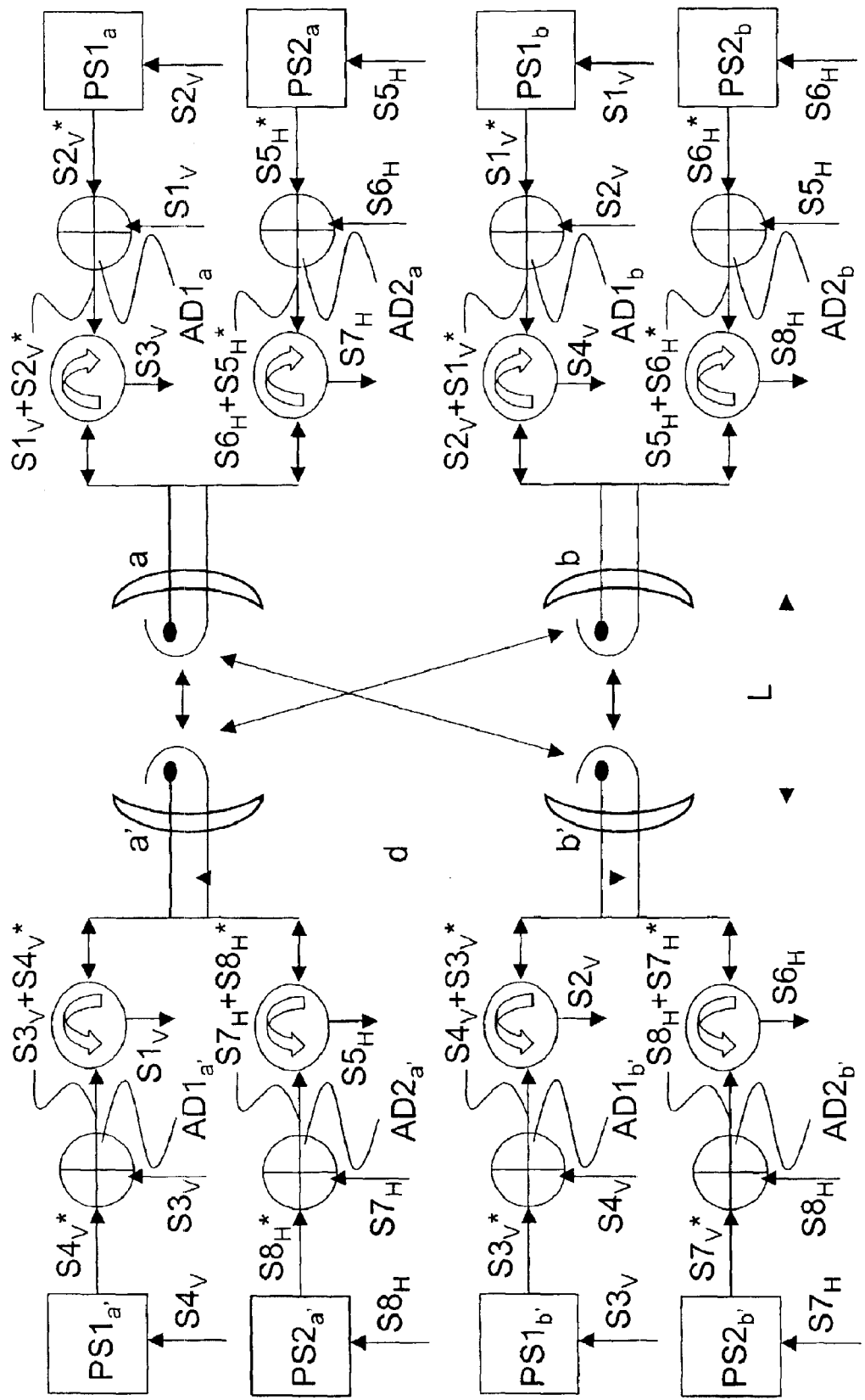
FIG. 5 shows a bidirectional radio transmission system with orthogonal cross-polarization according to the present invention.

In the system of FIGS. 5 and 6, from the antenna a the signal $S1_V$ is transmitted on the V-polarized carrier $P_0$ and from the antenna b the same signal $S1_V$ is transmitted on the carrier $P_0$ but phase-shifted by a certain angle Q (namely $S1_V^*$); on the receiving front, $S1_V$ will have an absolute maximum in a' on the V polarization (output from the circulator $CR_{a'_V}$) and an absolute minimum in b'. From the antenna a, the signal $S6_H$ is also transmitted on the H-polarized carrier $P_0$ and from the antenna b the same signal $S6_H$ is also transmitted on the carrier $P_0$ but phase-shifted by a certain angle Q' (possibly also equal to Q); on the receiving front, $S6_H$ will have an absolute maximum in b' on the H polarization (output from the circulator $CR_{b'_H}$) and an absolute minimum in a'. The same will occur for the other signals S2V, S3V, . . . S8V; S1V, S2V, . . . S8V, as it could be easily understood from the FIGS. 5 and 6.

Through the combination of the known frequency re-use concepts with the ones according to the present invention, the capacity of a single radio channel is even quadrupled vis-à-vis a single radio channel without cross-polarization.

Anyway, the involved variables to be set are: the distances (d, d') between the transmitting and receiving antennas and the link length (L) between the transmission and reception fronts. Since we are interested in a reciprocal system, it shall be considered d=d'; therefore, the only parameters involved shall be the distance between the antennas (d) and the link length (L), always in connection with the wavelength of the carrier.

With reference to the various FIGS. 2, it should be noted that the path length L is to be understood as a distance between the plane of transmitting antennas (trasmitting wave front) and the plane of receiving antennas (receiving wave front). It is only for reasons of convenience that it is considered only the case of antennas placed one in front of the other as in the bottom antenna arrangement of FIG. 2.3. In case the antennas are arranged as in FIG. 2.1, it is necessary to perform different shifts on the signals.

Since that the link length is generally fixed, the only project parameter can be the distance d between the antennas. For this purpose, the transmitting/receiving antennas can be indifferently placed horizontally (side-by-side) or vertically (one above the other). Nevertheless, it is preferable to mount them horizontally to avoid that the propagation phenomena, which depend on the altitude, give problems and interfere with the results.

In other words, if the antennas are placed at the same altitude, there are high chances to avoid differential fading problems which could result in different propagations on parallel links. It is true that the signals have to reach the receiving antennas with the same phase but also the amplitude has to be the same, otherwise, their phase shifted sum is not null, namely it does not result in the cancellation.

In the various FIGS. 3.1, 4 and 5 it has been decided to phase-shift only one of the signals transmitted through an antenna. For instance, in FIG. 3.1, the antenna a transmits a phase-shifted signal (S2*) and a non phase-shifted signal (S1). Nevertheless there is nothing against the possibility to phase-shift also S1 in order to compensate differences of signal path. It is always important to have a global phase shift so that the signals received be phase added at an antenna while are phase shift added at the other antenna. Therefore, the phase shifting can be artificially set (through the phase shifters) or by changing the path. Generically, it could be said (with reference to FIG. 3.1, for instance) that the phase shifting provided by $PS_a$ is a relative phase shifting.

Although, as a general rule, in order to implement the present invention, the difference of paths covered by the signals can be of whichever entity (but multiple of λ/2 vis-à-vis the carrier wavelength), such a path difference is to be considered limited to few multiples of carrier wavelength so that there are no attenuation path differences and propagation differences from the point of view of phase so that the modulating signal remains coherent. In other words, the phase differences of carrier are to be unsignificant from the point of view of the signal envelope (symbol time and so on).

It is evident that, in view of the present description and the enclosed drawings, different uses of the present invention as well as several variants, modifications, adaptations and replacements of parts by functionally equivalent components could become apparent for a man skilled in the art. Nevertheless, these new uses, variants, modifications, amendments and replacement of parts should be considered as within the scope of the invention which is limited only by the attached following claims.

We claim:

1. A method for increasing the spectrum efficiency in a point to point radio transmission system, wherein said method comprises the steps of:
   providing a first front comprising a first and a second antennas, said antennas being at a certain distance one from each other;
   providing a second front comprising a first and a second antennas, said antennas being at a certain distance one from each other, wherein said fronts are separated by a length, the method further comprising the steps of:
   feeding the first antenna of the first front with a first signal and a second signal phase-shifted by a certain angle;
   feeding the second antenna of the first front with the second signal and the first signal phase-shifted by a certain angle,
   wherein said signals are transmitted by utilizing carriers at the same frequency, and wherein the difference of the distances between an antenna of the second front and the two antennas of the first front results in a further phase-shift of carriers so that, at the first antenna of the second front, the sum of the first signal and of the second phase shifted signal is in phase while, at the second antenna of the second front, such a sum is in counter phase.

2. A method according to claim 1, wherein the phase shifting angle of the first signal or of the second signal is null.

3. A method according to claim 1, wherein the phase shifting angle of the first signal is equal to the phase shifting angle of the second signal.

4. A method according to claim 1, wherein said step of feeding the first antenna of the first front with a first signal comprises the step of feeding the first antenna of the first front with a first phase shifted signal.

5. A method according to claim 1, wherein said step of feeding the second antenna of the first front with the second signal comprises the step of feeding the second antenna of the first front with a second phase-shifted signal.

6. A method according to claim 1, wherein said transmission system is bidirectional, the distance between the antennas of the first front being equal to the distance between the antennas of the second front.

7. A method according to claim 6, further comprising the step of receiving, through said first and second antennas of the first front, a third and a fourth signal, respectively, sent through the antennas belonging to the second front.

8. A method according to claim 7, wherein the third signal is transmitted together with the fourth phase-shifted signal and said fourth signal is transmitted together with the third phase-shifted signal, wherein said third and fourth signals are transmitted by utilizing carriers at the same frequency.

9. A method according to claim 1, wherein said antennas are dual polarization (H, V) transmitting/receiving antennas, said first signal comprising a polarized signal and a differently polarized signal, said second signal comprising a polarized signal and a differently polarized signal.

10. A point-to-point radio transmission system providing an increased spectrum efficiency, wherein the system comprises:
- a first front comprising a first and a second antennas, said antennas being spaced by a certain distance one from each other;
- a second front which comprises a first and a second antennas, said antennas being spaced by a certain distance one from each other, said fronts are separated by a length, wherein:
- the first antenna of the first front is fed by a first signal and a second signal that is phase-shifted by a certain angle;
- the second antenna of the first front is fed by the second signal and the first signal phase-shifted by a certain angle,
- further wherein said signals are transmitted by utilizing carriers at the same frequency, and wherein the difference of distances between an antenna of the second front and the two antennas of the first front results in a further phase shifting of carriers, so that at the first antenna of the second front, the sum of the first signal and of the second phase shifted signal is in phase and, at the second antenna of the second front, it is in counter-phase.

11. A system according to claim 10, wherein it is a bidirectional system, the distance between the antennas of the first front being equal to the distance between the antennas of the second front.

12. A system according to claim 11, wherein it further compres circulators for receiving, through said first and second antennas of the first front, a third and a fourth signal, respectively, sent through the antennas belonging to the second front.

* * * * *